US012686307B2

(12) United States Patent
Martinka

(10) Patent No.: US 12,686,307 B2
(45) Date of Patent: Jul. 21, 2026

(54) SEAT HAVING AN ARMREST ASSEMBLY

(71) Applicant: Adient US LLC, Plymouth, MI (US)

(72) Inventor: Michal Martinka, Nové Mesto nad Váhom (SK)

(73) Assignee: Adient US LLC, Plymouth, MI (US)

( * ) Notice: Subject to any disclaimer, the term of this patent is extended or adjusted under 35 U.S.C. 154(b) by 342 days.

(21) Appl. No.: 18/314,213

(22) Filed: May 9, 2023

(65) Prior Publication Data

US 2023/0365039 A1 Nov. 16, 2023

(30) Foreign Application Priority Data

May 12, 2022 (DE) ..................... 10 2022 204 674.9
Sep. 19, 2022 (DE) ..................... 10 2022 209 812.9

(51) Int. Cl.
B60N 2/75 (2018.01)

(52) U.S. Cl.
CPC ............. B60N 2/767 (2018.02); B60N 2/753 (2018.02); B60N 2/77 (2018.02); B60N 2/773 (2018.02); B60N 2/777 (2018.02)

(58) Field of Classification Search
CPC ......... B60N 2/767; B60N 2/753; B60N 2/773
See application file for complete search history.

(56) References Cited

U.S. PATENT DOCUMENTS

| 5,143,422 A * | 9/1992 | Althofer ................... A47C 1/03 |
| | | 297/115 |
| 5,746,480 A * | 5/1998 | Bonutti ................... A47C 16/00 |
| | | 248/118 |

| 5,810,416 A * | 9/1998 | Hashimoto .......... B60N 2/3013 |
| | | 296/65.01 |
| 6,341,821 B1 * | 1/2002 | Rousseau ............. E02F 9/2004 |
| | | 297/411.44 |
| 2001/0022334 A1 * | 9/2001 | Iwata ................. A47B 21/0314 |
| | | 248/371 |
| 2006/0042857 A1 * | 3/2006 | Catton ................... B60N 2/767 |
| | | 180/334 |

(Continued)

FOREIGN PATENT DOCUMENTS

| CN | 109552127 A | 4/2019 |
| DE | 102017102429 A1 | 8/2018 |

(Continued)

OTHER PUBLICATIONS

China Patent and Trademark Office First Chinese Office Action dated Nov. 19, 2025 on Application No. 2023105380171 Beijing, China.

*Primary Examiner* — David R Dunn
*Assistant Examiner* — Tania Abraham
(74) *Attorney, Agent, or Firm* — Marshall & Melhorn, LLC

(57) ABSTRACT

An armrest assembly for a vehicle seat may have at least one rest element and a support element which is connected to the rest element. The rest element may be adjustable relative to the support element between at least one resting position, one stowage position and/or a plurality of comfort positions. At least one first adjustment unit may be provided and configured to hold the rest element so as to be movable in at least two degrees of freedom in each assumable and/or assumed position on the support element. A seat having the armrest assembly is also provided.

16 Claims, 4 Drawing Sheets

(56)  References Cited

U.S. PATENT DOCUMENTS

| | | | |
|---|---|---|---|
| 2006/0202541 A1* | 9/2006 | Armo ..................... | B60N 2/797 297/411.35 |
| 2016/0213152 A1 | 7/2016 | Zollars et al. | |
| 2017/0015224 A1* | 1/2017 | Colsky .............. | B64D 11/0644 |
| 2020/0329869 A1 | 10/2020 | Lai et al. | |

FOREIGN PATENT DOCUMENTS

| | | | |
|---|---|---|---|
| DE | 102011017225 B4 | 1/2019 | |
| EP | 3023296 A1 | 5/2016 | |
| FR | 3098770 A1 | 1/2021 | |
| WO | 2010132573 A1 | 11/2010 | |
| WO | 2020234080 A1 | 11/2020 | |

* cited by examiner

US 12,686,307 B2

1

SEAT HAVING AN ARMREST ASSEMBLY

FIELD

The invention relates to a seat having an armrest assembly. The seat is, for example, a vehicle seat, in particular a comfort seat.

BACKGROUND

Armrests for office chairs or vehicle seats having armrests are known from the prior art.

Known from US 2020/0329869 A1 or CN 109552127 is for example in each case a rotary adjuster for an armrest.

SUMMARY

It is an object of the present invention to specify a seat having an armrest assembly which is improved in comparison to the prior art, wherein the armrest assembly can assume a plurality of armrest positions.

The object is achieved according to the invention by a seat having the features of the claims.

The seat according to the invention, in particular a vehicle seat, comprises an armrest assembly which has at least one rest element, for example an upholstery element, and at least one support element which is connected to the rest element, the rest element being adjustable relative to the support element between at least one resting position, a stowage position and/or a plurality of comfort positions and/or intermediate positions, wherein at least one first adjustment unit is provided and configured to hold the rest element so as to be movable in at least two degrees of freedom relative to the support element in each assumable and/or assumed position on the support element. Moreover, at least one second adjustment unit can be provided and specified to hold the support element on the seat or on a structural part of the vehicle so as to be movable relative to the seat, or to the structural part of the vehicle, respectively, and independently of the rest element.

The rest element is, for example, an armrest and can be moved in a first direction and in a second direction synchronously and/or in a temporally offset manner.

For example, the first adjustment unit and the second adjustment unit can interact in such a manner that a first center of rotation predetermined by the first adjustment unit is movable or repositionable relative to the seat and/or the structural part of the vehicle. As a result, an especially variable adjustment of the rest element is made possible.

The rest element is adjustable between a plurality of inclined positions and longitudinal positions. The rest element in each of the assumable and/or assumed positions is adjustable relative to the support element in terms of both inclination and longitudinal setting.

For example, the first adjustment unit is configured to hold the rest element so as to be displaceable and pivotable in each assumable and/or assumed position on the support element.

The armrest assembly enables the rest element to be adjusted to a plurality of comfort positions for a person seated on the seat. The adjustment unit can be operated manually as well as by an electric drive unit.

The advantages achieved by the invention lie in particular in increasing the comfort level for a person seated on the seat. The rest element can assume different comfort positions for resting an arm and/or an elbow of the person in each position of the seat, for example of a backrest and/or of a seat part during driving, relaxing or sleeping.

A vehicle having such a seat may be an autonomously operable vehicle.

The armrest assembly has in particular a compact, slim and weight-reduced design. The armrest assembly makes it possible for a vehicle space for occupants and passengers to be enlarged.

For example, the first adjustment unit can be disposed in a connecting region between the rest element and the support element. For example, the first adjustment unit can connect the rest element to the support element. For example, the first adjustment unit can be embedded and/or integrated in the connecting region.

In a refinement, the support element can be configured to be adjustable between a resting position, a stowage position and a plurality of comfort positions.

For example, the support element, on a first support portion that faces the rest element, can have the first adjustment unit which is configured to hold the rest element on the first support portion so as to be in particular displaceable and pivotable in at least two degrees of freedom relative to the support portion.

Optionally, the first adjustment unit can be additionally configured to hold the rest element on the support element so as to be adjustable in at least three degrees of freedom relative to the support element.

A first degree of freedom may define a first adjustment direction, for example displacement direction or longitudinal adjustment direction, in terms of a longitudinal axis. For example, the rest element can be configured so as to be longitudinally adjustable relative to the support element in terms of a longitudinal axis running through the seat and/or the vehicle.

A second degree of freedom may define a second adjustment direction, for example pivoting direction or inclination direction, in terms of a transverse axis running through the seat and/or the vehicle. For example, the rest element can be configured so as to be pivotable relative to the support element in terms of the transverse axis, in particular a pivot axis, inclination axis or rotation axis.

At least one third degree of freedom may define a third adjustment direction, for example pivoting direction or inclination direction, in terms of the longitudinal axis. For example, the rest element can be pivoted or inclined about the longitudinal axis relative to the support element.

A fourth degree of freedom may define a fourth adjustment direction, for example displacement direction or transverse adjustment direction, in terms of the transverse axis. For example, the rest element can be displaced, for example longitudinally adjusted, relative to the support element along the transverse axis.

In the resting position, the rest element can be disposed so as to be substantially perpendicular to the support element and/or parallel to a seat part and/or substantially parallel to a backrest of the seat.

The support element in the resting position can be aligned relative to a vertical axis. For example, the support element can extend in the vertical direction of the seat and/or of the vehicle. In the resting position, the support element can be disposed so as to be substantially perpendicular or at a predetermined angle in relation to the seat part, and/or substantially parallel or at a predetermined angle in relation to the backrest of the seat.

In the stowage position, the rest element can be disposed parallel to the support element, for example, and bear on the latter, for example.

In the stowage position, the support element can be disposed so as to be parallel to the seat part and/or substantially perpendicular to the backrest in a lower backrest region, for example. For example, the support element can be disposed and stowed on a lateral seat side of the seat, for example bear on the lateral seat side.

In at least one of the comfort positions, and in each further assumable intermediate position, the rest element can be positioned so as to be pivoted relative to the support element and/or the seat part and/or the backrest. Additionally, the rest element is movable relative to the support element in the longitudinal direction of the vehicle.

In one of the comfort positions, and in each further intermediate position, the support element can be positioned so as to be pivoted relative to the seat part and/or the backrest. The rest element can be adjusted for height by pivoting the support element.

In a refinement, the support element can likewise be adjusted in at least two degrees of freedom relative to the seat and/or to the vehicle. For example, the support element can be longitudinally adjusted in the longitudinal direction of the seat and/or of the vehicle, and be pivoted about at least one pivot axis.

The first adjustment unit can be configured as a rotary system. The rest element can be displaceable in at least two directions relative to the first support portion. The rest element can be pivoted about a center of rotation predetermined by the adjustment unit. The adjustment unit can have a longitudinal adjustment unit which is configured to hold the rest element so as to be displaceable on the support element, in particular on the first support portion.

For example, the first adjustment unit can comprise at least one rotary adjuster and one longitudinal adjuster which interacts with the rotary adjuster. The rotary adjuster can have a rotary joint, for example. The longitudinal adjuster can have a guiding installation, for example.

For example, the first adjustment unit can be configured as a rotary sliding joint. The first adjustment unit can in particular be configured as a combined pivoting and sliding unit.

For example, the at least one adjustment unit can be disposed between a first support portion of the support element that faces the rest element, and a first face side, for example a lower face side, of the rest element that faces the support element.

A second face side of the rest element that lies opposite the first face side, for example an upper face side, can configure an arm rest face for a person seated on the seat.

The first support portion of the support element may define a center of rotation about which the rest element is pivotable.

The first face side of the rest element can have at least one guide element in and/or on which the first support portion of the support element is held so as to be guided in a displaceable manner. The guide element can be configured as a guide rail, guide groove, guide bar, sliding guide, or as any other guide element.

The first support portion can have a guide part that communicates with the guide element, for example. The guide part can comprise the center of rotation about which the rest element is pivotable, for example. The guide part can be configured, for example, as a guide rail, sliding guide, guide block, guide pin or guide stud, or as any other guide part. The guide part can be held at least in a form-fitting manner in and/or on the guide element.

The support element can comprise a second support portion that lies opposite the first support portion. The second support portion can be connected to a seat part of the seat and/or a structural part of the vehicle.

For example, a second adjustment unit can be provided and configured to hold the support element on the seat, for example on a backrest and/or a seat part of the seat, and/or the structural part of the vehicle. The at least one second adjustment unit can, for example, define a second center of rotation about which the support element is pivotable relative to the seat part, to the backrest and/or to the structural part of the vehicle.

The second adjustment unit can be configured as a rotary system. The second adjustment unit can be configured as a rotary joint. The second adjustment unit can hold the support element on the seat and/or the structural part of the vehicle so as to be adjustable in at least one degree of freedom. For example, the support element can be configured to be pivotable about a pivot axis relative to the seat and/or to the structural part of the vehicle.

In a refinement, the second adjustment unit can be configured as a rotary sliding joint. For example, the second adjustment unit can be configured as a combined pivoting unit and sliding unit. The second adjustment unit can be configured to hold the support element on the seat and/or the structural part of the vehicle so as to be adjustable in two degrees of freedom.

Optionally, the second adjustment unit can additionally be configured to hold the support element on the seat and/or the structural part of the vehicle so as to be adjustable in at least three degrees of freedom.

A first degree of freedom may define a first adjustment direction, for example displacement direction, in terms of a longitudinal axis. For example, the support element can be configured to be longitudinally adjustable relative to the seat and/or to the structural part of the vehicle in terms of a longitudinal axis running through the seat and/or the vehicle.

A second degree of freedom may define a second adjustment direction, for example pivoting direction or inclination direction, in terms of a transverse axis, for example pivot axis, inclination axis or rotation axis, running through the seat and/or the vehicle. For example, the support element can be configured to be pivotable relative to the seat and/or to the structural part of the vehicle in terms of the transverse axis, in particular pivot axis or rotation axis.

At least one third degree of freedom may define a third adjustment direction, for example pivoting direction or inclination direction, in terms of the longitudinal axis. The support element can be pivoted or inclined about the longitudinal axis relative to the seat and/or to the structural part of the vehicle, for example.

A fourth degree of freedom may define a fourth adjustment direction, for example displacement direction or transverse adjustment direction, in terms of the transverse axis. For example, the support element can be displaced, for example longitudinally adjusted, along the transverse axis relative to the seat and/or to the structural part of the vehicle.

The support element can be adjusted independently of the assumable and/or assumed position of the rest element relative to the seat and/or to the structural part of the vehicle.

The first adjustment unit and the second adjustment unit are disposed so as to be mutually spaced apart on the support element.

The object is furthermore achieved according to the invention by a seat, for example vehicle seat, in particular comfort seat, the seat having at least one backrest, one seat part, and one arm rest assembly according to the description above.

The armrest assembly can comprise, for example, at least one rest element and a support element which is connected to the rest element, the rest element being adjustable relative to the support element between at least one resting position, a stowage position and/or a plurality of comfort positions, wherein at least one first adjustment unit is provided and configured to hold the rest element so as to be movable in at least two degrees of freedom in each assumable and/or assumed position on the support element.

The support element can be disposed on the seat, for example in the region of the backrest and/or of the seat part, by way of a further second adjustment unit. The second adjustment unit can hold the support element so as to be adjustable relative to the support element in each assumable and/or assumed position of the rest element. The second adjustment unit can hold the support element on the seat and/or a structural part of the vehicle so as to be adjustable in at least one degree of freedom relative to said seat and/or said structural part of the vehicle.

The further second adjustment unit can be configured, for example, as a further rotary system. The support element can be pivoted about a second center of rotation, predetermined by the second adjustment unit, relative to the seat part and/or to the backrest and/or to the structural part of the vehicle.

For example, the first support portion by way of the first center of rotation can be movable for repositioning. The first support portion in a fixed position can be pivotable about the second center of rotation. In particular, the first center of rotation can be movable for repositioning in such a manner that the rest element carries out an arcuate movement, in particular about the second center of rotation, and, optionally, is additionally pivotable about the first center of rotation. Such a dual adjustability of the rest element, in particular in the form of a double joint, enables an adjustment of the first center of rotation toward the center of gravity of the rest element, or away from the center of gravity of the rest element toward an end position. A first pivoting range of the rest element that can be carried out about the first center of rotation can be smaller than a second pivoting range of the rest element that can be carried out about the first center of rotation in the end position. Alternatively, both pivoting ranges can be of identical size.

In particular, the rest element can be pivotable about the first center of rotation in the manner of a rocker. For example, the rest element can be pivotable about the first center of rotation in the manner of a rocker when the center of rotation is positioned in the center of gravity of the rest element.

The rest element can also be pivotable upward as well as downward about the first center of rotation, for example in relation to a horizontal resting position.

DESCRIPTION OF THE FIGURES

Exemplary embodiments of the invention will be explained in more detail with the aid of drawings in which:

FIG. 3 in a schematic illustration shows a seat, for example vehicle seat, having an armrest assembly according to the invention, comprising at least one rest element and a

Figure 4:
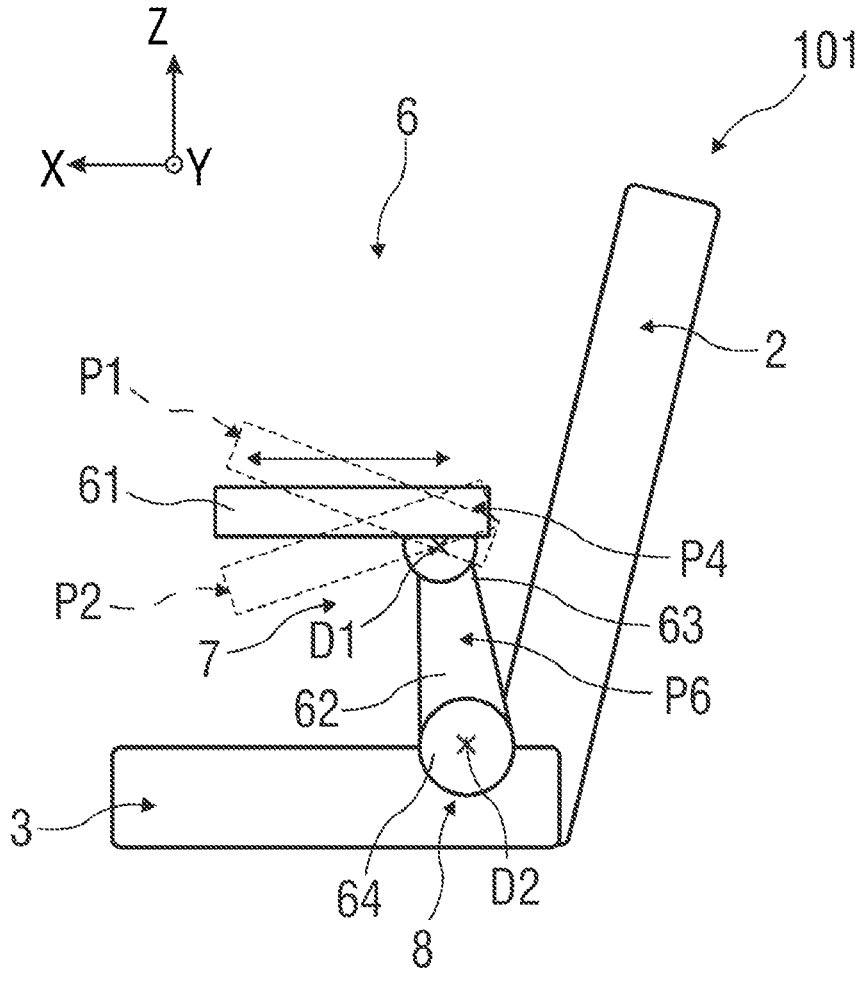

6 support element which supports the rest element, the rest element being shown in a rear comfort position; and FIG. 4 in a schematic illustration shows a seat, for example vehicle seat, having an armrest assembly according to the invention, comprising at least one rest element and a support element which supports the rest element, the rest element being shown in a front comfort position.

DETAILED DESCRIPTION

Mutually equivalent parts are provided with the same reference signs in all figures.

Figure 1:
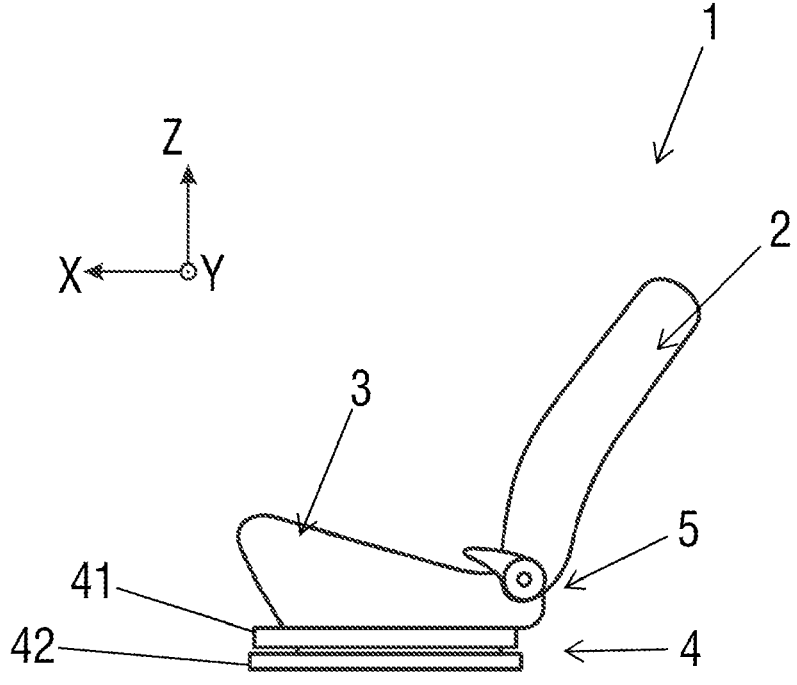
FIG. 1 in a schematic illustration shows a vehicle seat having a longitudinal adjustment installation according to the prior art.

A vehicle seat 1 which pertains to the prior art and is schematically illustrated in FIG. 1 will be described hereunder while using three spatial directions running perpendicularly to one another. A longitudinal direction X in a vehicle seat 1 installed in the vehicle runs largely horizontally and preferably parallel to a vehicle longitudinal direction, the latter corresponding to the usual direction of travel of the vehicle. A transverse direction Y, running perpendicularly to the longitudinal direction X, is likewise horizontally oriented in the vehicle and runs parallel to a vehicle transverse direction. A vertical direction Z runs perpendicularly to the longitudinal direction X and perpendicularly to the transverse direction Y. In a vehicle seat 1 installed in the vehicle, the vertical direction Z preferably runs parallel to a vehicle vertical axis.

The positional indications and directional indications used, such as front, rear, top and bottom, for example, relate to a viewing direction of an occupant seated in a normal sitting position in the vehicle seat 1, whereby the vehicle seat 1 is installed in the vehicle, is in a use position which with an upright backrest 2 is suitable for conveying passengers, and is aligned in the travel direction, as is customary. The vehicle seat 1 can however also be installed or moved in an alignment deviating therefrom, for example transversely to the travel direction.

The backrest 2 can be disposed so as to be pivotable on a seat part 3 of the vehicle seat 1. To this end, the vehicle seat 1 can comprise a fitting 5, in particular a rotary fitting, such as a latching fitting or a tumbling fitting.

The vehicle seat 1 can comprise a longitudinal adjustment installation 4, in particular a rail assembly having a first rail element 41 and a second rail element 42. The first rail element 41 is adjustable in the longitudinal direction X relative to the second rail element 42. The first rail element 41 is fastened to the seat part 3. The second rail element 42 is fastened to a structural element of a vehicle, for example a vehicle floor.

Figure 2:
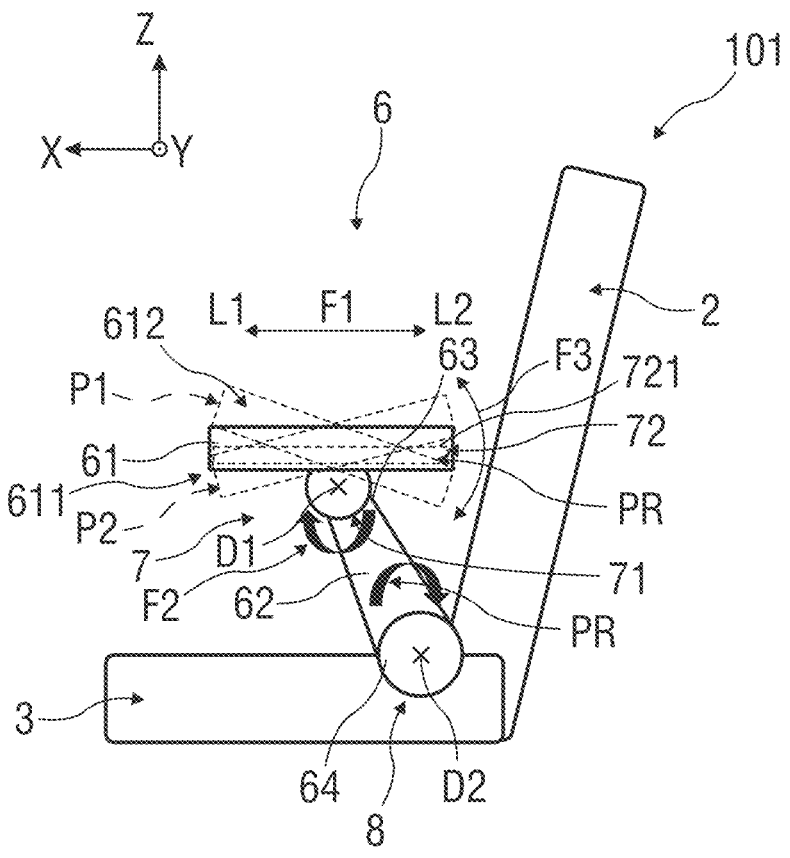
FIG. 2 in a schematic illustration shows a seat, for example vehicle seat, having an armrest assembly according to the invention, comprising at least one rest element and a support element which supports the rest element, the armrest assembly being shown in a resting position.

FIG. 2 in a schematic illustration shows a seat 101, for example vehicle seat 1, in particular comfort seat, having an armrest assembly 6 comprising at least one rest element 61 and a support element 62 which supports the rest element 61. The seat 101, in particular comfort seat, can be, for example, a comfortable stand-alone front seat or rear seat with armrests. The comfort seat can be, for example, a so-called "captain's chair".

The armrest assembly 6 can be provided for an interior of a vehicle not illustrated in more detail, for example for a vehicle seat 1 and/or for a center console of the vehicle. For example, the center console, which can be used as an armrest, can move conjointly when the vehicle seat 1 is longitudinally adjusted.

The rest element 61 is an armrest. The armrest can have an upholstery element, for example.

The support element 62 can be upholstered, for example.

The support element 62 comprises a first support portion 63 that faces the rest element 61.

The support element 62 comprises a second support portion 64 which can be connected to the seat part 3. Alternatively or optionally, the second support portion 64 can additionally be connected to a structural part of the vehicle or to the backrest 2. For example, the structural part of the vehicle can be embodied so as to be movable and be conjointly moved when the vehicle seat 1 is longitudinally adjusted.

The support element 62, in particular the first support portion 63, by way of a first adjustment unit 7 is connected to the rest element 61 in such a manner that the rest element 61 is held on said support portion 63 so as to be displaceable and pivotable relative to the support portion 63.

The armrest assembly 6 enables the rest element 61 to be adjusted to a plurality of comfort positions P1 to Pn for a person seated on the seat 101. The adjustment unit 7 can be operated manually as well as by an electric drive unit not illustrated in more detail. It is to be understood here that the rest element 61 when longitudinally adjusted or else pivoted can assume all intermediate positions not illustrated in more detail.

The first adjustment unit 7 is provided and configured to hold the rest element 61 so as to be movable, in particular readjustable or adjustable, in at least two degrees of freedom F1, F2 relative to the support element 62 in each assumable and/or assumed position on the support element 62.

Moreover, at least one second adjustment unit 8 can be provided and specified to hold the support element 62 on the seat 101 or a structural part of the vehicle so as to be movable relative to the seat 101, or to the structural part of the vehicle, respectively, and independently of the rest element 61. For example, the first adjustment unit 7 and the second adjustment unit 8 can interact in such a manner that a first center of rotation D1 predetermined by the first adjustment unit 8 is movable or repositionable relative to the seat 101 and/or the structural part of the vehicle.

The advantages achieved by the invention lie in particular in increasing a comfort level for the person seated on the seat 101. The rest element 61 can assume different comfort positions P1 to Pn for resting and supporting an arm and/or elbow of the person in each position of the seat 101, for example of the backrest 2 and/or of the seat part 3, during driving, relaxing or sleeping.

The armrest assembly 6 has in particular a compact, slim and weight-reduced design. The armrest assembly 6 enables a vehicle space for occupants and passengers to be enlarged.

The rest element 61 can be configured to be adjustable between a resting position PR, a stowage position not illustrated in more detail, and a plurality of comfort positions P1 to Pn.

In the resting position PR, the rest element 61 can be disposed so as to be substantially parallel to the seat part 3. In the resting position PR, the first support portion 63 can be aligned so as to be centric to the rest element 61.

In the stowage position, the rest element 61 can be disposed so as to be parallel to the support element 62, for example, and bear on the latter, for example.

In at least one of the comfort positions P1, P2, and in each further assumable intermediate position, the rest element 61 can be positioned so as to be pivoted relative to the seat part 3 and/or to the backrest 2. Additionally, the rest element 61 can be moved in the longitudinal direction X of the vehicle relative to the support element 62, and be positioned in a front or rear comfort position P3, P4, as shown in the following figures, and in each intermediate position.

The support element 62 can be configured so as to be adjustable between a resting position PR, a stowage position not illustrated in more detail, and a plurality of comfort positions P5 to P6, as is shown in the following figures.

In the resting position PR, the support element 62 can be disposed so as to be substantially perpendicular or at a predetermined angle in relation to the seat part 3.

In the stowage position, the support element 62 can be disposed parallel to the seat part 3, for example, and bear on a lateral seat side of the seat part 3, for example.

In one of the comfort positions P5, P6, the support element 62 can be positioned so as to be pivoted relative to the seat part 3 and/or to the backrest 2. The rest element 61 can be adjusted for height by pivoting the support element 62.

The support element 62, in particular the second support portion 64, by way of the second adjustment unit 8 is connected to the seat part 3 in such a manner that the support element 62 is held on the seat part 3 so as to be pivotable relative to the latter.

The adjustment units 7, 8 can be configured as rotary systems, for example in the form of rotary joints.

The first adjustment unit 7 can be configured, for example, as a combined unit of a rotary joint and a longitudinal adjustment unit, in particular as a rotary sliding joint.

The rest element 61 can be displaceable in at least two directions L1, L2 relative to the first support portion 63. The rest element 61 can be pivoted about a center of rotation D1 predetermined by the first adjustment unit 7.

The support element 62 can be pivoted relative to the seat part 3 and/or to the backrest 2 about a center of rotation D2 predetermined by the second adjustment unit 8. The second adjustment unit 8 can be configured as a rotary joint.

For example, the first adjustment unit 7 can comprise at least one rotary adjuster 71. The rotary adjuster 71 can be configured as a rotary joint. The adjustment unit 7 can furthermore comprise a longitudinal adjuster 72 which interacts with the rotary adjuster 71. The longitudinal adjuster 72 can be configured as a guide rail, for example. The rotary adjuster 71 can be disposed on a sliding guide that communicates with the guide rail. The sliding guide can be held so as to be guided in the guide rail. The rotary adjuster 71 can comprise the center of rotation D1.

For example, the at least one adjustment unit 7 is disposed between the first support portion 63 of the support element 62 that faces the rest element 61 and a first face side 611, for example a lower face side, of the rest element 61 that faces the support element 62.

The first face side 611 can comprise the longitudinal adjuster 72, for example. The face side 611 can be provided, for example, with a guide element 721 which has previously been referred to as the guide rail. The rotary adjuster 71, which defines the center of rotation D1, can be disposed on the first support portion 63. The rotary adjuster 71 can be held so as to be guided in the guide element 721. The rotary adjuster 71 can be disposed on a sliding guide which is not illustrated in more detail and is held so as to be guided in the guide element 721.

A second face side 612 that lies opposite the first face side 611, for example an upper face side, of the bearing element 61 can configure an arm rest face for a person seated on the seat 101.

The second adjustment unit 8 defines a second center of rotation D2 about which the support element 62 is pivotable relative to the seat part 3, to the backrest 2 and/or to the structural part of the vehicle.

The first support portion 63, by way of the first center of rotation D1 is in particular configured so as to be movable or repositionable in relation to the second support portion 64. The first support portion 64, in particular in a fixed position, is pivotable about the second center of rotation D2.

In particular, the first center of rotation D1 can be movable for repositioning in such a manner that the rest element 61 carries out an arcuate movement F3, in particular about the second center of rotation D2, and optionally is additionally pivotable about the first center of rotation D1 according to the degree of freedom F2. Such a dual adjustability of the rest element 61, in particular in the form of a double joint (D1 and D2), enables an adjustment of the first center of rotation D1 toward a center of gravity SP of the rest element 61, or away from the center of gravity SP toward an end position EL of the rest element 61. A first pivoting range of the rest element 61 that can be carried out about the first center of rotation D1 when the latter is positioned in the center of gravity thereof at the center of gravity SP can be smaller than a second pivoting range of the rest element 61 that can be carried out about the first center of rotation D1 in one of the end positions EL of said rest element 61. Alternatively, both pivoting ranges can be of identical size. The first center of rotation D1 can be identical to the center of gravity SP of the rest element 61. Alternatively, the first center of rotation D1 can be offset, in particular horizontally and/or vertically offset, in relation to the center of gravity SP.

For example, the first center of rotation D1 can be movable for repositioning in such a manner that the rest element 61 carries out an arcuate movement F3 and, optionally, is additionally pivotable about the first center of rotation D1. The rest element 61, for example in the manner of a rocker, is pivotable about the first center of rotation D1, as is illustrated in FIG. 2. In this way, the rest element 61 can be pivotable upward as well as downward about the first center of rotation D1 to one of the comfort positions P1, P2, for example in relation to the horizontal resting position or resting position PR of said rest element 61.

Figure 3:
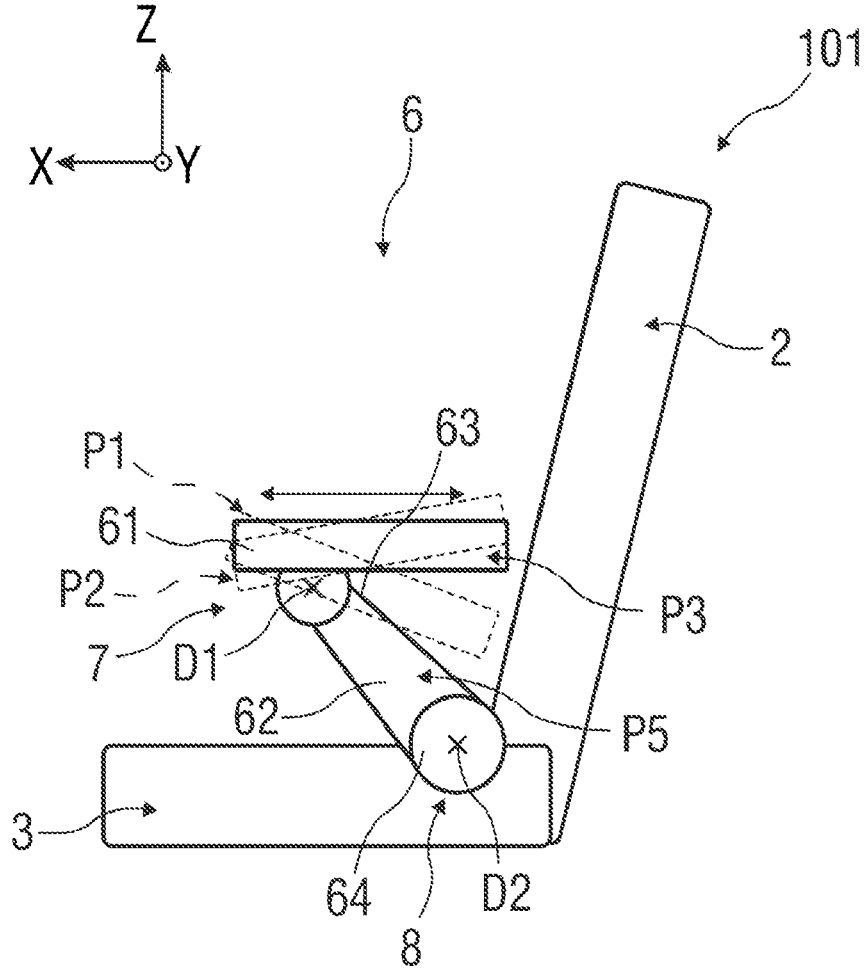

FIG. 3 in a schematic illustration shows a seat 101 having the armrest assembly 6 described above, comprising at least one rest element 61 and a support element 62 which supports the rest element 61, the rest element 61 being disposed in a rear comfort position P3, for example a first longitudinal position.

In the rear comfort position P3, or in any other intermediate position not illustrated in more detail, the rest element 61 can additionally be pivoted about the center of rotation D1 to the comfort positions P1, P2 and intermediate positions. The rear comfort position P3 of the rest element 61 may correspond to a front end position EL1.

The support element 62 is situated, for example, in a comfort position P5 which is pivoted toward the front and in which the rest element 61 is disposed closer to the seat part 3.

FIG. 4 in a schematic illustration shows a seat 101 having the armrest assembly 6 described above, comprising at least one rest element 61 and a support element 62 which supports the rest element 61, the rest element 61 being disposed in a front comfort position P4, for example a second longitudinal position.

In the front comfort position P4, or any other intermediate position not illustrated in more detail, the rest element 61 can additionally be pivoted about the center of rotation D1 to the comfort positions P1, P2 and intermediate positions. The front comfort position P4 of the rest element 61 may correspond to a rear end position EL2.

The support element 62 is situated, for example, in a comfort position P6 which is pivoted toward the rear and in which the rest element 61 is disposed farther away from the seat part 3.

While the invention has been described in the drawings and in the preceding illustration, the illustrations are to be understood as being illustrative and exemplary and not restrictive. In particular, the choice of the proportions of the individual elements illustrated in the drawings should not be interpreted as necessary or limiting. Furthermore, the invention is in particular not limited to the exemplary embodiments explained.

Terms used in the description, such as "comprise", "have", "include", "contain" and the like do not preclude further elements or steps. The use of the indefinite article does not preclude a plurality.

LIST OF REFERENCE SIGNS

1 Vehicle seat
2 Backrest
3 Seat part
4 Longitudinal adjustment installation
41 First rail element
42 Second rail element
5 Fitting
6 Armrest assembly
61 Rest element
611, 612 Face side
62 Support element
63 First support portion
64 Second support portion
7 Adjustment unit
71 Rotary adjuster
72 Longitudinal adjuster
721 Guide element
8 Adjustment unit
101 Seat
D1, D2 Center of rotation
EL End position
EL1 Front end position
EL2 Rear end position
F1, F2 Degree of freedom
F3 Arcuate movement
L1, L2 Direction
P1 to Pn Comfort position
PR Resting position
SP Center of gravity
X Longitudinal direction
Y Transverse direction
Z Vertical direction

The invention claimed is:

1. A vehicle seat, having an armrest assembly which comprises at least one rest element and a support element which is connected to the rest element, the rest element being adjustable relative to the support element between at least one resting position, a stowage position, and/or a plurality of comfort positions, wherein at least one first adjustment unit is provided and configured to hold the rest element so as to be movable in at least two degrees of freedom relative to the support element in each assumable and/or assumed position on the support element; and wherein at least one second adjustment unit is provided and specified to hold the support element on the seat or a structural part of the vehicle so as to be movable relative to the seat, or to the structural part of the vehicle, respectively, and independently of the rest element, wherein a first face side of the rest element comprises a longitudinal adjuster, and wherein the longitudinal adjuster is in direct slidable and direct pivotable contact with a rotary adjuster, wherein the longitudinal adjuster is adapted to pivot in a vertical direction relative to the rotary adjuster.

2. The seat as claimed in claim 1, wherein the first adjustment unit and the second adjustment unit interact in such a manner that a first center of rotation predetermined by the first adjustment unit is movable or repositionable relative to the seat and/or the structural part of the vehicle.

3. The seat as claimed in claim 2, wherein the at least one first adjustment unit is disposed between a first support portion of the support element that faces the rest element and the first face side of the rest element that faces the support element.

4. The seat as claimed in claim 3, wherein the first support portion of the support element defines the first center of rotation about which the rest element is pivotable.

5. The seat as claimed in claim 4, wherein the longitudinal adjuster of the first face side of the rest element has at least one guide element in and/or on which the first support portion of the support element is held so as to be guided in a displaceable manner.

6. The seat as claimed in claim 3, wherein the support element comprises a second support portion which is connected to the seat and/or the structural part of the vehicle.

7. The seat as claimed in claim 3, wherein the at least one second adjustment unit defines a second center of rotation about which the support element is pivotable relative to the seat, to a backrest and/or to the structural part of the vehicle.

8. The seat as claimed in claim 7, wherein the first support portion by way of the first center of rotation is movable for repositioning, and a second support portion is pivotable about the second center of rotation.

9. The seat as claimed in claim 8, wherein the first center of rotation is movable for repositioning in such a manner that the rest element carries out an arcuate movement and is pivotable about the first center of rotation.

10. The seat as claimed in claim 1, wherein the first adjustment unit is configured to hold the rest element so as to be displaceable and pivotable in each assumable or assumed position on the support element.

11. The seat as claimed in claim 1, wherein the first adjustment unit is configured as a rotary sliding joint.

12. The seat as claimed in claim 1, wherein the second adjustment unit is configured as a rotary joint.

13. The seat as claimed in claim 1, wherein the rest element in the manner of a rocker is pivotable about a first center of rotation.

14. The seat as claimed in claim 1, wherein the rest element in relation to a horizontal resting position is pivotable upward as well as downward about a first center of rotation.

15. The seat as claimed in claim 1, wherein the longitudinal adjuster consists of one piece.

16. The seat as claimed in claim 1, wherein the rotary adjuster consists of one piece.

* * * * *